Dec. 9, 1969  A. BOGOSIAN  3,482,896
OPTICAL VIEWING DEVICE
Filed March 1, 1968  4 Sheets-Sheet 1
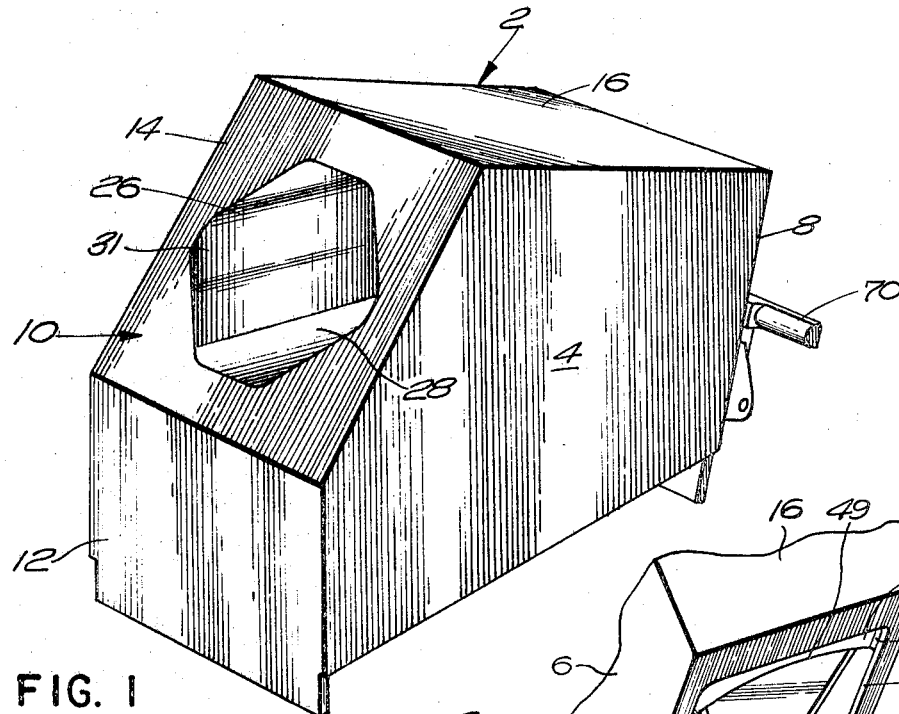
FIG. 1
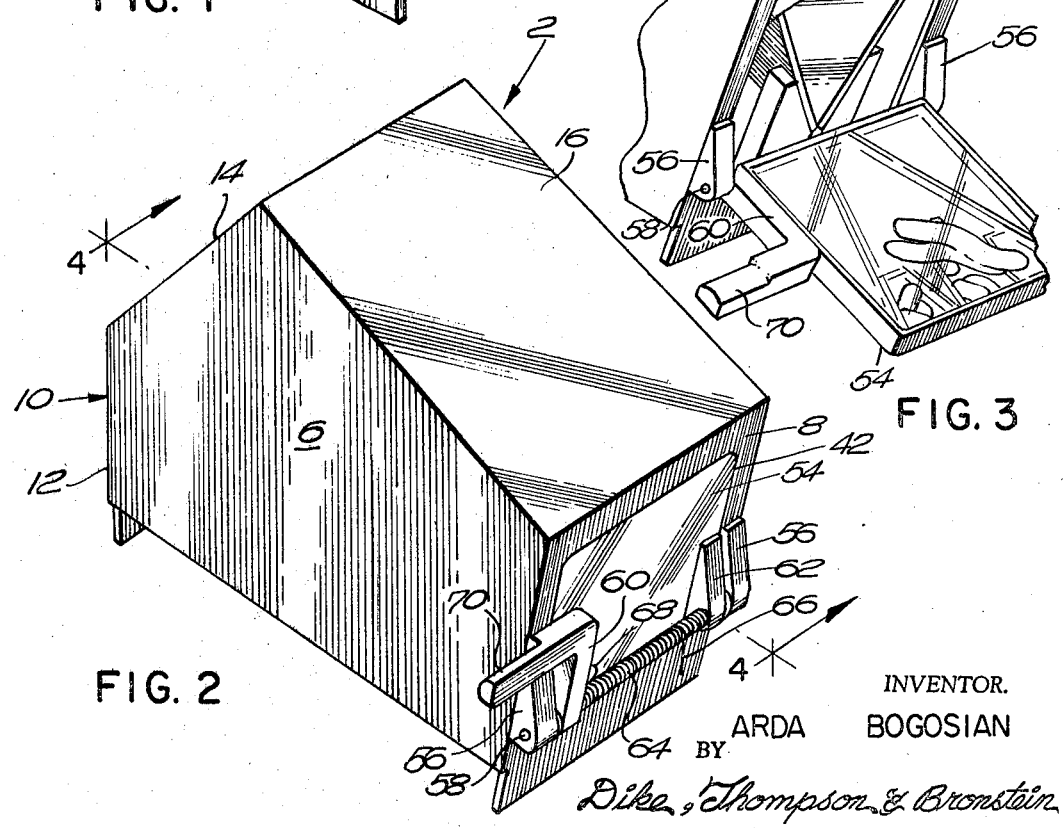
FIG. 2
FIG. 3
INVENTOR.
ARDA BOGOSIAN
BY Dike, Thompson & Bronstein
ATTORNEYS

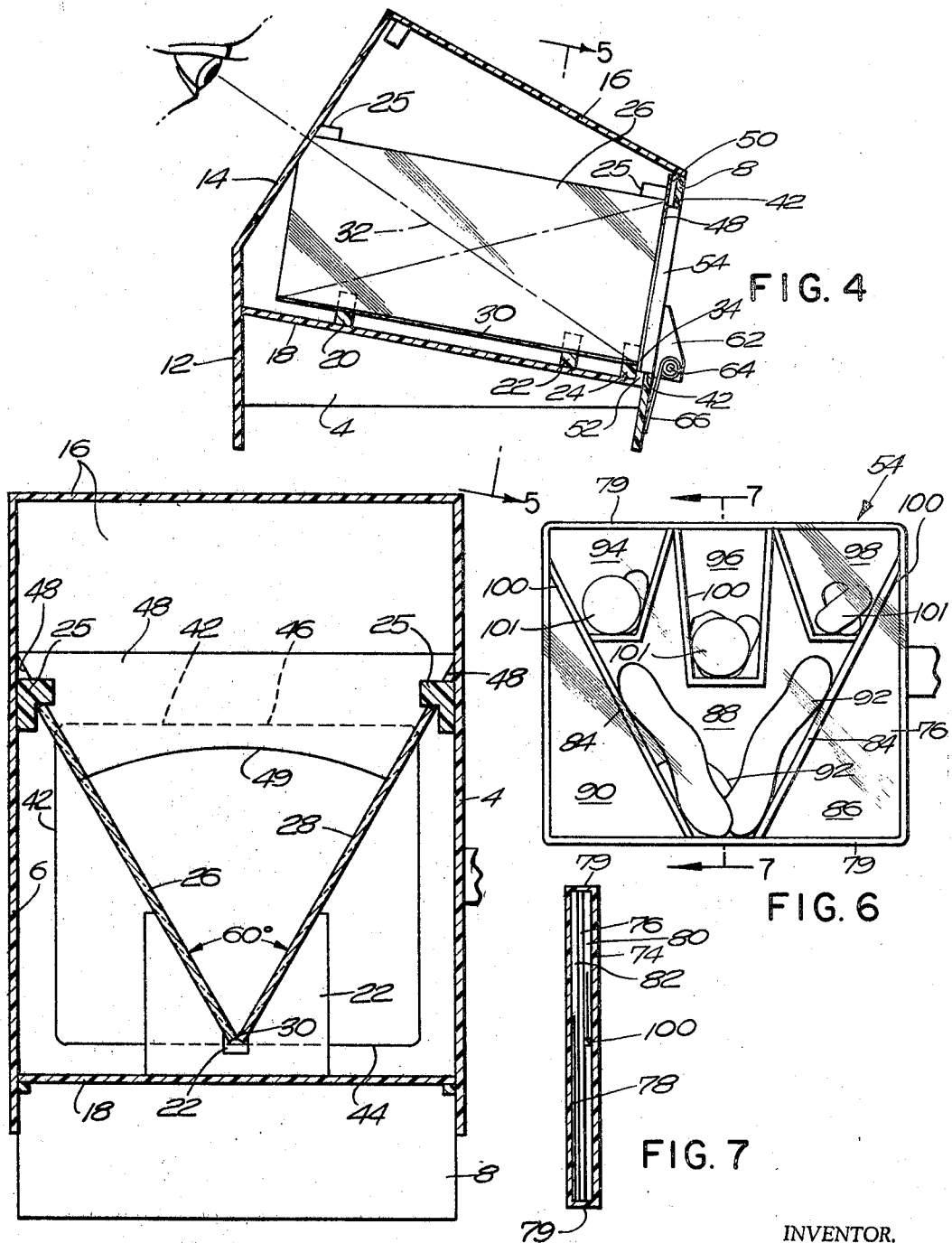

Dec. 9, 1969     A. BOGOSIAN     3,482,896
OPTICAL VIEWING DEVICE

Filed March 1, 1968     4 Sheets-Sheet 3

INVENTOR.
ARDA BOGOSIAN
BY
Dike, Thompson & Bronstein
ATTORNEYS

Dec. 9, 1969  A. BOGOSIAN  3,482,896
OPTICAL VIEWING DEVICE
Filed March 1, 1968  4 Sheets-Sheet 4
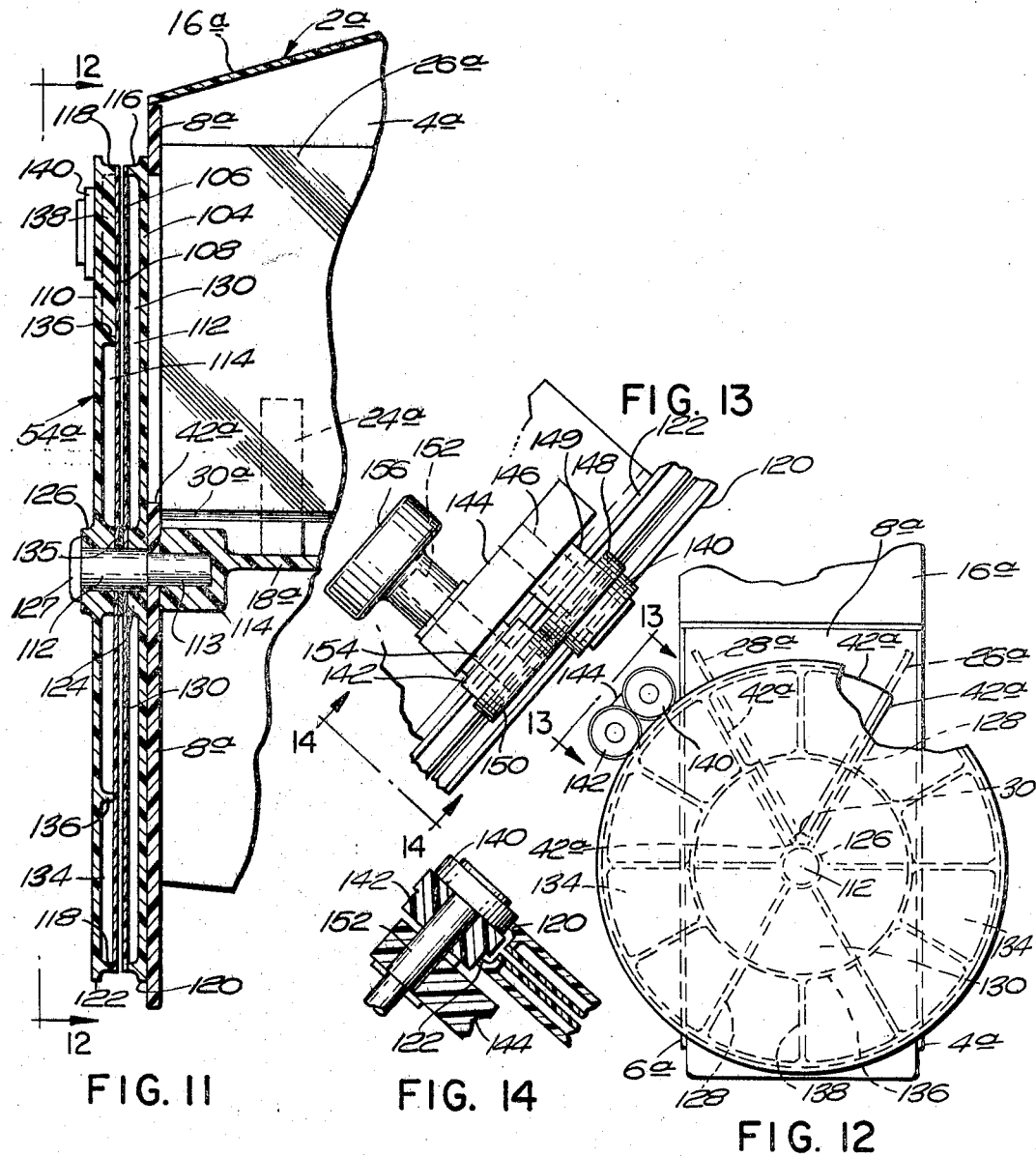
INVENTOR.
ARDA BOGOSIAN
BY
Dike, Thompson & Bronstein
ATTORNEYS 3,482,896
OPTICAL VIEWING DEVICE
Arda Bogosian, Cambridge, Mass.
(P.O. Box 115, N. Postal Annex, Boston, Mass. 02114)
Continuation-in-part of application Ser. No. 668,230,
Sept. 15, 1967. This application Mar. 1, 1968, Ser.
No. 712,332
Int. Cl. G02b 27/08
U.S. Cl. 350—4                                    26 Claims

ABSTRACT OF THE DISCLOSURE

An optical viewing device containing two plane mirrors placed at an angle of approximately 60° and mounted in a container casing which is light proof except through a broad view window in an end wall thereof at one end of the mirrors and except through a translucent closure covering an opening in the opposite end wall of the container casing at the other end of the mirrors. The closure comprises a plurality of substantially parallel plates made up of an outer translucent plate and one or more inner transparent plates, to form one or more compartments each of which is partitioned into one or more pockets of various shapes and sizes, each pocket containing a plurality of translucent or transparent pieces or fragments of various shapes, sizes and colors. The plane of the viewing window is inclined in a direction from bottom to top from a plane normal to the apex line (referred to hereinafter as apex) of the mirrors toward the end wall having the closure to form an acute angle, e.g., 50 to 70°, with such apex so that the upper portion of the window is tilted toward the end wall having the opening. Accordingly, the viewer looks from the window end of the mirror surfaces at a slight angle downwardly on the mirror surfaces adjacent the closure as he looks lengthwise along the length of the mirrors toward the closure at the other end of the mirrors. Preferably the plane of the viewing window is perpendicular to a line extending through the end of the apex of the mirrors adjacent the end wall having the opening and through the midpoint of a line extending through the two upper corners of the mirrors adjacent the end wall having the viewing window. The closure is located closely adjacent the other end of the mirrors and extends across a substantial portion of the other end of the mirrors and the space therebetween. The closure is mounted on the container casing for movement thereof with respect to the container casing in a manner in which the translucent or transparent pieces become rearranged in position in the pockets to form a variety of designs, whereby the pieces and the reflections of them in the mirrors provide an infinite variety of pleasing symmetrical colored patterns. The closure may be pivotally mounted on the container casing for swinging movement out of and into close position, whereby the pieces are rearranged, or it may consist of a plurality of spaced, parallel discs which are rotatable about an axis parallel to the apex of the mirrors or it may consist of a cylinder rotatably mounted on the container casing for rotation about an axis perpendicular to the apex of the mirrors with a peripheral portion of the cylinder extending into the opening in the end wall.

---

This application is a continuation-in-part of my application Ser. No. 668,230, filed Sept. 15, 1967, and now abandoned.

Brief summary of the invention

The present invention relates to an improved optical viewing device, sometimes refered to as a kaleidoscope device, for creating and viewing an infinite variety of colored patterns.

The device of the present invention is simple in construction and operation and inexpensive to manufacture.

The patterns may be viewed with both eyes through a broad view window without the necessity of placing the eye over a small aperture in an eye piece. This permits greater ease in viewing as well as a much greater variety of visual effects than are possible with conventional kaleidoscopes. Furthermore, more complex image patterns can be created. Furthermore, the device of the present invention provides exceedingly clear, bright and fine images with a minimum of distortion without the necessity of an artificial light source.

The device of the present invention comprises simply a pair of plane mirrors mounted in a container at an angle of about 60° (between 55 and 65°), the container being generally light proof except for a broad view viewing window in an end wall thereof at one end of the mirrors and except for a light passing closure closing an opening in an opposite end wall of the container at the other end of the mirrors.

The closure is made up of an outer translucent plate and one or more substantially parallel, spaced, transparent, inner plates to form one or more compartments between the plates. Each compartment is partitioned into one or more pockets, each of which loosely contains a plurality of translucent or transparent, flat, colored pieces or fragments, preferably of varying shapes and colors, which form a design. The closure is located closely adjacent, preferably abutting, the other end of the mirrors and straddles the space between the ends of the mirrors. The closure is movable by hand or otherwise relative to the container to rearrange the pieces to form a large variety of designs, which, together with the reffections thereof in the mirror, provide an infinite variety of pleasing symmetrical colored patterns to the viewer through the window.

The window is relatively large in area so that the viewer can look through it with both eyes. The plane of the window is inclined in a direction from bottom to top from a plane normal to the apex of the mirrors and toward the end wall having the closure to form an acute angle with such apex so that the top of the window is tilted away from the plane normal to the apex and toward the end wall having the closure. By this arrangement, the lines of vision of the viewer through the window and normal to the plane of the window fall on the end portions of the mirror surfaces adjacent the closure and also on the closure itself. Thus, the viewer looks down on the mirror surfaces adjacent the closure as well as at the closure itself when he looks through the window. Preferably, the inclined window is at an elevation above the apex of the mirrors so that the viewer may look down at a substantial portion of the mirror surfaces adjacent the closure, as aforesaid. In order to achieve exceedingly clear and undistorted images through the viewing window, the plane of the window is preferably substantially normal to a line extending through the end of the apex of the mirrors adjacent the end wall having the opening and through the midpoint of a line passing through the two upper corners of the mirrors adjacent the end wall having the viewing window.

The closure is preferably made up of a plurality of flat plates normal to the apex of the mirrors and may be moved to rearrange the pieces, either by pivotally attaching it to the container casing for swinging movement about an axis perpendicular to the apex out of and into close position, or by rotating the plates about an axis parallel to the apex. In the latter case, the plates are preferably in the form of circular discs. However, the closure may comprise a cylinder, the outer peripheral, circumferential, curvilinear wall of which comprises the transparent plate or one of them. A radially, inwardly spaced parallel wall forms the translucent plate and the cylinder is rotatably mounted on the container casing for rotation about an axis perpendicular to the apex of the mirrors.

Preferably, the closure comprises at least three parallel plates to form at least two compartments therebetween. The partitions in each compartment, which divide the compartment into pockets, are differently arranged to provide a greater variety and complexity of images. Thus, by locating the pockets in one compartment at different portions of the cross-sectional area of the closure, compared to the pockets in the other compartments, the pieces can be distributed over such area in a variety of ways and new visual effects can be achieved by overlapping the pockets in the different compartments.

Where parallel, circular discs are used, rotatable about an axis parallel to the apex, each compartment may be formed by a pair of discs, each pair of discs being separately and coaxially rotatable either in the same or the discs can be frictionally driven by flexible, e.g. rubber, drive rolls engaging the periphery or peripheries of the discs. Where two or more separably rotatable pairs of discs are used, a drive roll may be used for each pair, the drive rolls being geared together so as to be turned together by the viewer simply turning a knob.

Brief description of the drawings

Other advantages and features of the present invention will be apparent from the accompanying drawings of certain embodiments of the invention and the following descriptions thereof. In the drawings:

FIG. 1 is a front-side view in perspective of a device embodying the invention and incorporating a closure swingable into and out of closed position;

FIG. 2 is a rear-side view in perspective of the device of FIG. 1;

FIG. 3 is a view like FIG. 2 of the closure end of the device but with the closure swung partially open;

FIG. 4 is a reduced view along the line 4—4 of FIG. 2;

FIG. 5 is a view taken along the line 5—5 of FIG. 4;

FIG. 6 is a detailed front view in elevation of the closure of FIG. 5 as it appears when looking in the direction of FIG. 5;

FIG. 7 is a view taken along the line 7—7 of FIG. 6;

FIG. 11 is a cross-sectional view in elevation of yet another embodiment of the closure of the invention comprising rotatable parallel discs;

FIG. 12 is a view taken along the line 12—12 of FIG. 11;

FIG. 13 is a view taken along the line 13—13 of FIG. 12; and

FIG. 14 is a view taken along the line 14—14 of FIG. 13.

Detailed description

Figure 8:
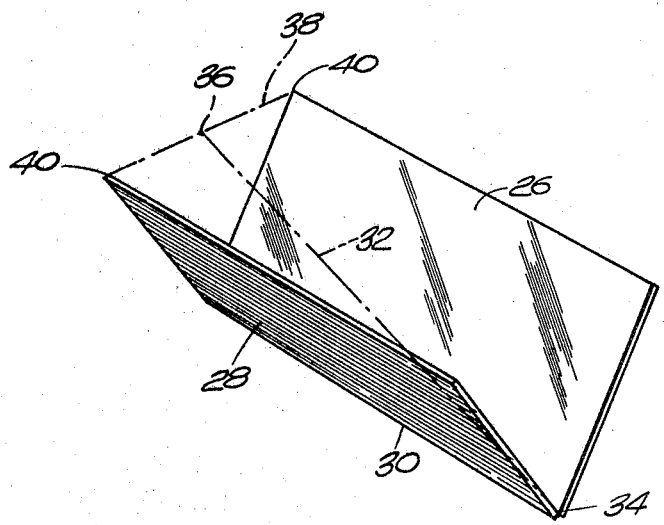
FIG. 8 is a view in perspective of the two mirrors of FIG. 5.

With reference to FIGS. 1 to 8 of the drawings, 2 represents a container casing made up of a pair of vertical side walls 4 and 6, a pair of end walls 8 and 10, the former of which is inclined from vertical about 10° and the latter of which consists of a lower vertical portion 12 and an upper portion 14 inclined from horizontal about 50°, a top wall 16 inclined from horizontal about 30° and a floor or bottom wall 18 inclinded from horizontal about 10° and spaced above the lower edges of the side and end walls. The lower edges of the side walls 4 and 6 do not extend to the lower edges of the end walls 8 and 10 either so that the lower portions of the end walls constitute feet for resting the container on a supporting surface. The walls of the container are rigid and are made of a black plastic, such as polystyrene, through which light does not pass.

Mounted within the container casing 2 by means of three flat plastic cradles 20, 22 and 24 of like construction glued to the floor 18 and four plastic holding lugs 25, two of which are glued to side wall 4 and two to side wall 6, are two plane, elongated mirrors 26 and 28 mounted at a 60° angle to form a V-shaped trough. The apex line 30 of the two mirrors is parallel to the plane of the floor 18. The inclined portion 14 of end wall 10 at one end of the mirrors is provided with a broad view transparent viewing window 31. In the embodiment shown in the drawings, the long horizontal and vertical dimensions of the window are between 2 and 3 inches, e.g. 2½ inches, with a window of about four to nine square inches. This window may be produced by making end wall portion 14 or the entire end wall 10 of a transparent plastic or of glass and painting all but the window with a black paint.

The plane of the window 31, i.e. the plane of end wall portion 14, is tilted or inclined forwardly (toward end wall 8) from bottom to top with respect to a plane normal to the apex of the mirrors and the window is located at an elevation above the apex of the mirrors, so that the viewer looks at a slight angle downwardly on the mirror surfaces adjacent end wall 8 as he looks from the window end of the mirror surfaces through the window lengthwise along the mirror surfaces toward the closure 54. Put in another way, the lines of vision through the window and perpendicular to the plane of the window fall on a substantial portion of the mirror surfaces adjacent the closure and also on the closure. In the embodiment shown in the drawings, the plane of the window 31 is normal (within 5 or 10° in either direction) to an imaginary line 32 (FIGS. 4 and 8) passing through the end 34 of the apex line 30 of the mirrors adjacent end wall 8 and through an imaginary point 36 midway on an imaginary line 38 passing through the upper corners 40 of the mirrors adjacent the end wall 10. This arrangement minimizes distortion, the least distortion being provided when the plane of the window is exactly normal to imaginary line 32.

End wall 8 has an opening 42 therein straddling the ends of the mirrors 26 and 28 and the space therebetween. The plane of the opening as well as of end wall 8 is generally normal to the planes and apex of the mirrors. The lower edge 44 (FIG. 5) of the opening is located slightly below the adjacent end of the apex of the mirrors and the upper edge 46 is at an elevation slightly lower than the top edges of the mirrors. Thus, the opening 42 lies opposite and exposes most of the end of the V-shaped trough formed by the mirrors. Located directly inside the upper portion of end wall 8 and across the uppermost portion of the opening 42 is a frame strip 48 of a dark (black) thin flexible material, such as paper or plastic, through which light will not pass, e.g. black paper. The frame strip 48 is wedged between the top portion of end wall 8 and the upper portions of the ends of the mirrors adjacent such end wall 8 and between the top portion of end wall 8 and the adjacent lugs 25, which are flush with the ends of the mirrors. This top portion of end wall 8 has an additional thickness 50, made up of a strip of plastic, for wedging the frame strip 48 between it and adajacent lugs 25. Frame strip 48 depends downwardly over a portion of the opening 42 and the lower edge 49 thereof is curvilinear to form a curved upper frame for the portion of opening 42 lying opposite the V-shaped space between the ends of the mirrors. The portion of end wall 8 adjacent the lower edge of the opening 42 also has a strip 52 of the same thickness as strip 50 and located between end wall 8 and the cradle 24, the outer face of cradle 24 being flush with the end edges of the two mirrors. Also, the inner walls of strips 50 and 52 are substantially flush with the end edges of the mirrors. Opening 42 is closed by a planar closure 54, which is pivotally attached at its lower end to the end wall 8 by means of a pair of spaced plastic lugs 56 integral with end wall 8 and a pivot pin 48, the ends of which are fixedly received in holes in lugs 56 and which extends through pin receiving holes in plastic lugs 60 and 62 attached to the opposite edge portions of the back surafce of the closure 54. The closure 54 is rotatable about pin 58. The closure is biased to close position, as shown in FIGS. 1, 2 and 4, by coil spring 64 located around the pin 58 between lugs 60 and 62. One end 66 of spring 64 engages the end wall 8 and the other end 68 extends into a hole in lug 60. Lug 60 extends upwardly along the back surface of the closure and then at a right angle at 70 to form a handle. By grasping the handle, the closure can be swung outwardly and downwardly about pivot 58 out of close position as shown in FIG. 2, to the position shown in FIG 3. The closure 54 conforms in shape with opening 42 and fits closely within the edges of the opening. When the closure is in closed position, it abuts against or is closely adjacent the end edges of the two mirrors and is perpendicular to the planes of the two mirrors and to the apex line 30 thereof. Thus the closure lies opposite the end of the V-shaped trough formed by the mirrors. The lower edge of the closure 54 lies either opposite or slightly below the adjacent end of the apex line of the mirrors and the upper edge is located above the lower curvilinear lower edge 49 of the frame strip 48. The side edges of the closure 54, as well as the opening 42, are located laterally beyond the end edges of the mirrors below the lower edge 49 of frame strip 48 so that the closure covers the entire space formed by the adjacent end edges of the mirrors below the frame edge 49.

The closure is made up of three flat plastic (e.g. polystyrene), parallel, spacel plates 74, 76 and 78 (see FIGS. 6 and 7). The outer plate 74 is white and translucent (frosted in appearance) and the inner plates 76 and 78 are transparent. The plates form two compartments, 80 between plates 74 and 76, and 82 between plates 76 and 78. These compartments are closed at their peripheries by a transparent, plastic wall 79 extending around the peripheries of the plates and glued thereto to hold the plate assembly together.

The inner compartment 82 is provided with partitions 84 dividing the compartment into pockets 86, 88 and 90. The partitions comprise flat strips of transparent plastic glued to the plates 76 and 78. The partitions 84 are placed at an angle of about 60° in the general form of a V and lie opposite the end edges of the mirrors 26 and 28 when the closure 54 is closed. However, the partitions do not come together to form an apex so that the pocket 88 formed thereby has a flat floor. Thus, pocket 88 lies opposite the space formed by the end edges of the two mirrors and the lower edge 49 of frame strip 48, the floor of the pocket being at about the same elevation as the adjacent end of the apex line of the mirrors. Located loosely within pocket 88 is a plurality of thin, flat, translucent or transparent plastic pieces or fragments 92 of varying colors, shapes and sizes. When the closure is closed, these pieces fall randomly to the bottom of the pocket 88.

The outer compartment 80 is divided into pockets 94, 96 and 98 of varying shapes and sizes by partitions 100 of transparent plastic strips glued to plates 74 and 76, as shown. These pockets are distributed widthwise along the upper portion of compartment 80 opposite the space between partitions 84 whereas the pocket 88 in compartment 82 extends from top to bottom of the compartment 82. Thus, the lower portion of pocket 88 is below the pockets 94, 96 and 98. Most of the area of pockets 94, 96 and 98, including the lower portions, lies opposite the space formed by the adjacent end edges of the two mirrors and the lower frame edge 49 of frame strip 48. Each of the pockets 94, 96 and 98 contains a plurality of thin, flat, translucent or transparent pieces or fragments 101 of plastic of various shapes, sizes and colors. When the closure is closed, these pieces fall randomly to the bottom of the pockets.

When the closure 54 is swung open to the position shown in FIG. 3, the top of the closure becomes lower in elevation than the bottom with the result that the pieces 92 and 101 tumble from their design arrangement at the bottoms of the pockets to the tops of the pockets. When the closure is released and returned to close position by the spring 64, the pieces again randomly tumble to the bottoms of the pockets in a rearranged and new design.

The composite of the randomly arranged pieces of various shapes, sizes and colors in all the pockets 88, 94, 96 and 98 produce a unique design which is changed every time the closure is moved to rearrange the pieces as aforesaid. To the viewer viewing the closure through the viewing window 31, this design is seen against a frosty white background provided by light passing through the white translucent plate 74, transparent plates 76 and 78 and the translucent or transparent colored pieces 92 and 101. The light passing through the white translucent outer plate 74 and transparent inner plates 76 and 78 and through the flat colored translucent or transparent pieces 92 and 101 give the pieces an exceedingly bright and sharp appearance. The curvilinear lower edge 49 of the frame strip 48, provides a curvilinear upper frame for the white background. Actually, the portion of the closure 54 which can be seen, as such, through the viewing window 31 is the V-shaped segment or wedge extending between the adjacent end edges of the mirrors and framed at the top by the curvilinear edge 49. This framed wedge or segment has the shape of a segment of a circle. The pockets in the closure and the flat plastic pieces 92 and 101 in such pockets are located in this segment of the closure. However, this segment together with the reflection thereof in the two mirrors presents to the viewer through the viewing window an attractive symmetrical pattern in which the white translucent background is circular. Actually, the effect to the viewer is that the circular segment repeats itself around a 180° arc to form a symmetrical circle made up of a plurality of such circle segments.

By swinging the closure to the open position shown in FIG. 3 followed by swinging it back to close position, to thereby rearrange the pieces 92 and 101 in their pockets to form a new composite design, the result is to change the pattern presented to the viewer. In this way, an infinite number of designs of the pieces, and hence an infinite number of image patterns, can be presented to the viewer.

In FIGS. 11 to 14, the plates of the closure are in the form of an assembly 54a of rotatable, circular discs 104, 106, 108 and 110 which rotate about a horizontal stepped pin 112, the reduced end 113 of which is secured in a thickened portion 114 in the floor 18a of the container 2a, which corresponds in construction to the container 2 of FIGS. 1 to 8 except that the closure end wall 8a and the side wall 4a and 6a extend downwardly below the floor 18a further to provide clearance for the circular, rotatable closure discs 104–110, as shown in FIG. 11, and except that the sides of the opening 42a in end wall 8a are sloped to form a general V shape slightly wider than the V of the mirrors 26a and 28a, as shown in FIG. 12. The mirrors 26a and 28a, corresponding to 26 and 28 in FIGS. 1 to 8, are arranged in the same way in the container 2a, one of the cradles 24a, corresponding to 24 in FIGS. 1 to 8, being shown in FIG. 11. However, the closure disc assembly 54a does not fit within the opening 42a, but rather is located flush against the outer surface of end wall 8a as shown, with only sufficient clearance therebetween to permit rotation of the adjacent disc 104 with respect to end wall 8a and with only a segment of the disc assembly located over the opening 42a at one time, the disc assembly being rotatable over the opening 42a.

Actually closure 54a is made up of two sets of parallel, circular, spaced discs, one set being discs 104 and 106 and the other set being discs 108 and 110. Each set is separably and coaxially rotatable on and about pin 112. It may be seen that these discs rotate about an axis which is parallel to and spaced slightly below the apex 30a of the mirrors.

The outermost disc 110 is milky white and translucent whereas the other discs 104, 106 and 108 are transparent. The space between discs 104 and 106 forms a compartment 112 and the spacing between discs 108 and 110 form a compartment 114. The peripheral portion of disc 104 has an annular flange 116 extending axially therefrom to the periphery of disc 106 to close the periphery of compartment 112 and the peripheral portion of disc 110 has an annular flange 118 extending axially to the periphery of disc 108 to close the periphery of compartment 114. Each of the annular flanges or walls 116 and 118 is spaced radially inwardly slightly from the periphery of its disc 104 and 110, respectively, to form peripheral ridges 120 and 122. Each of the discs 104 and 110 has a central hub 124 and 126, respectively, which extends axially to the disc 106 and 108, respectively and through which pin 112 passes, the disc assembly being held on the pin by the head 127 of the pin. A spacer 135 is provided between the two sets of discs 104–106 and 108–110.

Compartment 112 is partitioned by transparent, radially extending, plastic partitions 128 into a plurality of circumferentially spaced, V-shaped pockets 130 extending radially from the hub 124 to the circumferential wall 116. Each of these pockets contains loosely therein a plurality of translucent or transparent, flat, plastic pieces of various colors, shapes and sizes.

Compartment 114 is partitioned by transparent plastic partitions 136 (circumferentially extending) and 138 (radially extending) into a plurality of circumferentially spaced pockets 134. Each of the pockets 134 contains loosely therein a plurality of flat translucent or transparent plastic pieces or fragments of various shapes, colors and sizes. The pockets 134 are located in the peripheral half of the compartment 114 and partitions 136 and 138 in compartment 114 are differently arranged than the partitions 128 in compartment 112.

It is noted that the sides of the pockets 130 are at about the same angle with respect to each other as the mirrors 26a and 28a. The same with respect to the sides of opening 42a.

The pockets 130 and 134 are rotatable in front of the opening 42a in end wall 8a. In FIG. 12, one pocket 130 is aligned with opening 42a. Note that the side walls of this pocket, and hence partitions 128, are parallel to the side walls of the opening 42a and to the end edges of the two mirrors and lie slightly outside of the side walls of the opening. Also, the bottom and top edges of the pocket are slightly below and above the bottom and top edges of the opening, respectively so that the contour of the pocket corresponds to the contour of the opening. Thus, substantially the entire pocket 130 lies in front of the opening. At the same time, two of the smaller pockets 134 are located in front of the opening 42a. Note that the outer sides of the two pockets are parallel to the sides of the pocket 42a and to the end edges of the two mirrors and that the radial dimension of the pockets 134 is about ½ the corresponding dimension of the opening. As in the case of the embodiment of FIGS. 1 to 8, the colored pieces or fragments in the two pockets 134 and the single pocket 130, which are located in front of the opening, form a design which together with the reflections thereof in the two mirrors presents a symmetrical and multi-colored pattern to the viewer through the viewing window. By rotating the disc closure assembly 54a about pin 112 and in front of the opening, the pieces in the pockets are rearranged and the next adjacent pocket 130 and next adjacent two pockets 134 are brought in front of the opening 42a. The fragments in these adjacent pockets are arranged in a different design than the pieces in the pockets previously in front of the opening to produce a different viewing previously in front of the opening to produce a different viewing pattern. In this way, an infinite variety of image patterns can be formed and viewed. Each time that the same pockets are brought in front of the opening the image is different since the pieces have been rearranged by rotation of the discs.

The two sets of discs 104–106 and 108–110 are separably rotatable and can be rotated together or in opposite directions to vary the patterns. The spacer 135 permits rotation in opposite directions.

The two sets of discs are rotated by means of a pair of rubber drive rolls 140 and 142, mounted on end wall 8a by means of a bracket 144, drive roll 140 being held in driving engagement with rim or ridge 120 and drive roll 142 being held in driving engagement with ridge or rim 122.

Drive roll 140 is mounted on the end of a pin 146 which is rotatably mounted at its other end in the bracket 144, and which has a gear 148 also mounted thereon with a spacer 149 located between bracket 144 and gear 148. The drive roll 140 and gear 148 rotate with pin 146.

Gear 148 meshes with a gear 150 which is mounted on the end of a pin 152 for rotation with such pin. Pin 152 is parallel to pin 146, is also mounted for rotation in bracket 144 and also has mounted thereon for rotation therewith drive roll 142, with a spacer 154 being located between drive roll 142 and the bracket 144. The other end of pin 152 is provided with an operating knob 156. Turning of knob 156 by hand turns drive roll 142 which rotates the set of discs 108 and 110. At the same time, drive roll 140 is rotated in a direction opposite from drive roll 142 through gears 150 and 148 to rotate the set of discs 104 and 106 in a direction opposite from the direction in which set of discs 108 and 110 is rotated to bring in front of the opening 42a the various pockets in the discs as aforesaid and to rearrange the plastic pieces or fragments in the pockets.

Although in FIGS. 11 to 14, the apex of mirrors 26a and 28a is shown as being horizontal and end wall 8a is shown as being vertical for the sake of simplicity, they are actually inclined in the same way as mirrors 26 and 28 and end wall 8 of FIGS. 1 to 8.

Figure 9:
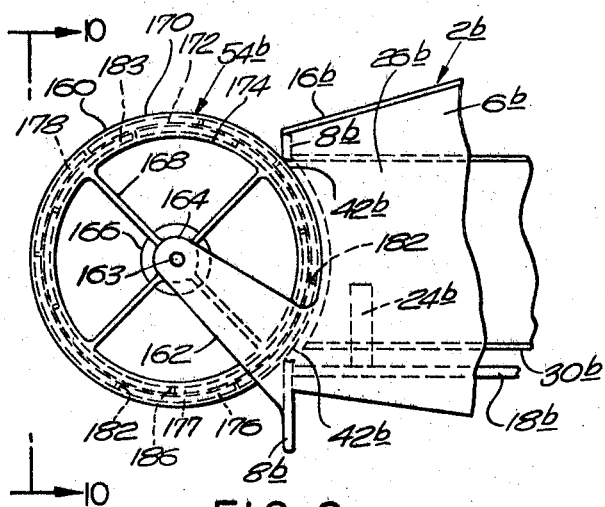
FIG. 9 is a view in elevation of another embodiment of the closure of the present invention which comprises a cylinder, a part of the periphery of which extends into the opening in the container casing.
Figure 10:
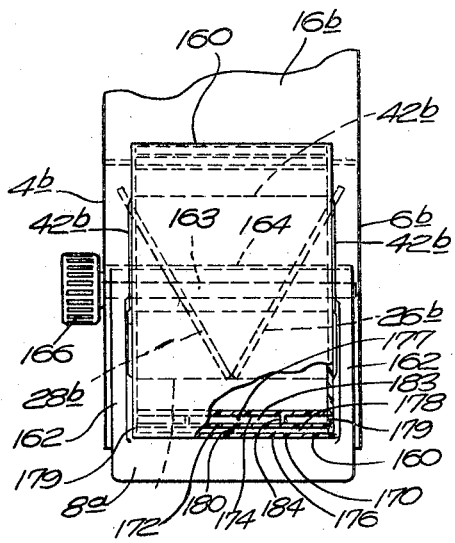
FIG. 10 is a view taken along the line 10—10 of FIG. 9.

In FIGS. 9 and 10, the closure 54b is in the form of a rigid plastic cylinder 160 rotatably mounted in front of the opening 42b (corresponding to opening 42 in FIGS. 1 to 8) in end wall 8b (corresponding to end wall 8 in FIGS. 1 to 8) by means of a pair of brackets 162 attached to the rear portion of container 2b (corresponding to container 2 in FIGS. 1 to 8) and extending rearwardly thereof from end wall 8b. The two mirrors 26b and 28b, cradle 24b, floor 18b, top wall 16b, side walls 4b and 6b apex 30b and opening 42b in end wall 8b, correspond to mirrors 26 and 28, cradle 24, floor 18, top wall 16, side walls 4 and 6, apex 30 and opening 42, respectively, of FIGS. 1 to 8 and have the same constructions and arrangement except that the end edges of the mirrors adjacent the opening are recessed to receive a peripheral portion of the cylinder, as shown. The view in window and the end wall in which it is located are not shown but have the same construction as in FIGS. 1 to 8. This is also true of the embodiment shown in FIGS. 11 to 14.

Cylinder 160 is hollow and is rotatably mounted on brackets 162 by means of a horizontal pin 163 extending through the center hub 164 of cylinder 160. The ends of pin 163 are rotatably received in bearing holes at the ends of brackets 162, the cylinder being mounted on the pin for rotation therewith. One end of the pin protrudes sideways beyond the bracket 162 in which it is mounted, such protruding portion having a turning knob 166 attached thereto for rotating the cylinder. Thus, the cylinder rotates about an axis which is perpendicular to the apex line 30b of the mirrors. Extending radially from the hub 164 of the cylinder 160 are a plurality of spokes 168 to the ends of which are attached three curvilinear, parallel, radially spaced, circumferentially extending, plastic plates 170, 172 and 174, which form the peripheral circumferential portion of the cylinder 160. Other plate 170 is white (frosty in appearance) and translucent whereas plates 172 and 174 are transparent as is also true of the spokes 168.

Plates 170 and 172 form an annular compartment 176 and plates 172 and 174 form an annular compartment 177, the two compartments being closed at their sides by walls 179 of transparent plastic. Compartment 176 is partioned into a plurality of pockets 178 by means of a plurality of transparent, plastic circumferentially extending partitions 180 and a plurality of transparent plastic axially extending partitions 182. Compartment 177 is partitioned into a plurality of pockets 183 by means of a plurality of transparent, plastic, circumferentially extending partitions 184 and a plurality of transparent, plastic, axially extending partitions 186. The partitions in compartment 176 are differently arranged than the partitions in compartment 177. Each of the pockets 178 and 183 contain a plurality of translucent of transparent thin plastic pieces or fragments of a variety of sizes, shapes and colors.

A portion of the periphery of the cylinder 160 extends into the opening 42b in end wall 8b of the container casing 2b, as shown in FIG. 9 so that a plurality of the pockets 178 and 183 are located in the opening and, together with the reflections thereof in the mirrors, are visible through the viewing window. By turning the cylinder, the pieces in the pockets are rearranged into different designs and succeeding pockets are brought into the opening to provide an infinite variety of different image patterns through the viewing window.

The invention is not limtied to or by the aforesaid descriptions and accompanying drawings but only to the devices claimed in the following claims and their equivalents.

I claim:

1. An optical viewing device comprising a container having a pair of side walls and a pair of end walls of nonlight passing material forming a mirror chamber, a pair of plane rectangular mirrors mounted at an angle of between about 55° and 65° within said chamber to form a generally V-shaped trough, one of said end walls at one end of said mirrors having a viewing window and the other end wall at the other end of said mirrors having an opening, the plane of said receiving window being inclined from bottom to top toward said other end wall and away from a plane which is normal to the apex line of said mirrors to form an acute angle with said apex line, said opening being closed by a closure, said closure consisting of a plurality of parallel, spaced plates which are located closely adjacent to said other end of said mirrors, one plate of said closure being translucent and the remainder being transparent, said plates forming at least one compartment therebetween, said compartment containing translucent or transparent colored pieces of various shapes and sizes which fit loosely within said compartment, said mirror chamber being substantially light proof except through said translucent and transparent plates and through said viewing window, said closure being mounted on said container for movement thereof with respect to said container in a manner in which said pieces become rearranged in position in said compartment to form a variety of designs, whereby said pieces and the reflections of them in said mirrors provide an infinite variety of pleasing symmetrical colored patterns to the viewer through said viewing window.

2. A device according to claim 1, the plane of said viewing window being substantially normal to a line extending through the end of the apex of said mirrors adjacent said other end wall and through the midpoint of a line extending through the two upper corners of the mirrors adjacent said one end wall.

3. A device according to claim 1, said closure comprising at least three parallel plates, the outside plate being translucent and the other plates being transparent, the outside plate forming with an intermediate plate a first compartment in which a plurality of said pieces are received, the inside plate forming with an intermediate plate a second compartment in which a plurality of said pieces are located.

4. A device according to claim 3, at least one of said compartments having partitions forming a plurality of pockets of various shapes and sizes, each containing a plurality of said pieces.

5. A device according to claim 4, the other compartment also having partitions forming a pocket which contains a plurality of said pieces and which conforms in shape to the space between the edges of said mirrors, the partitions in said other compartment being arranged differently than the partitions in said one compartment.

6. A device according to claim 1, said viewing window being at an elevation which is greater than said apex.

7. A device according to claim 1, said plates being flat and perpendicular to said apex line and extending across a substantial portion of the other ends of said mirrors and the space therebetween.

8. A device according to claim 1, said closure being swingably mounted on said container so as to be swung about an axis into and out of closed position over said opening, the closure having a sufficient range of swing about its axis so that it can be swung out of closed position to a position at which the inclination of the plates of said closure is changed sufficiently to cause said pieces to be displaced from their design in said compartment whereupon when the closure is again rotated to closed position to thereby change the inclination of said plates, the pieces again rearrange themselves in a new design to present a new pattern through said viewing window.

9. A device according to claim 1, said closure comprising a cylinder rotatably mounted at said other end, and outside, of the container for rotation about an axis perpendicular to the apex of said mirrors, a peripheral portion of said cylinder being rotatable within said opening, one of said plates of said closure comprising the curvilinear, circumferential peripheral wall of said cylinder, whereby said compartment is annular in shape, said compartment being partitioned into a plurality of circumferentially spaced pockets each containing a plurality of said pieces, and means for rotating said cylinder about its axis to cause said pieces in said pockets to be rearranged and thereby present said variety of patterns.

10. A device according to claim 9, including at least two transparent spaced plates parallel to said peripheral plate to form at least two annular compartments, each of which is partitioned by partitions into a plurality of pockets, each of which contains a plurality of said pieces, the partitions in one compartment being arranged differently than the partitions in the other compartment.

11. A device according to claim 1, said closure comprising an assemblage of a plurality of flat parallel discs mounted for rotation in front of said opening about an axis parallel to the apex of said mirrors, said discs being perpendicular to said apex, and means for rotating said disc assemblage relative to said container to cause said pieces to be rearranged in said compartment to present a variety of patterns through said viewing window.

12. Apparatus according to claim 11, said compartment formed by said discs being partitioned into a plurality of circumferentially spaced pockets.

13. A device according to claim 12, said discs being substantially greater in area than said opening, said pockets being rotatable in front of said opening by rotation of said assemblage.

14. Apparatus according to claim 11, said closure comprising at least three discs the outer disc being translucent and the remainder transparent, the outer disc forming with an intermediate disc a first compartment partitioned into a plurality of circumferentially spaced pockets containing loosely therein a plurality of said pieces, the inner disc forming with an intermediate disc a second compartment partitioned to form a plurality of circumferentially spaced pockets containing loosely therein a plurality of said pieces, the partitions in said pockets in said first compartment being differently arranged than the partitions in said second compartment.

15. Apparatus according to claim 14, the pockets in one of said compartments being the same or larger in radial size than the pockets in the other compartment.

16. Apparatus according to claim 15, the pockets in said other compartment being located at the peripheral portion of said discs.

17. Apparatus according to claim 14, said assemblage comprising at least two pairs of discs, one of said pairs forming said first compartment and the other of said pairs forming said second compartment, each pair of discs having a peripheral wall circumferentially closing the compartment formed thereby, said pairs of discs being separably rotatable in the same or different directions.

18. A device according to claim 17, said means for rotating said discs comprising a flexible drive roll for each of said pairs of discs and mounted on said container with the periphery of one of said drive rolls in engagement with the periphery of one of said pairs of discs and with the periphery of the other of said drive rolls in engagement with the periphery of the other of said pairs of discs and means for simultaneously turning said drive rolls to thereby rotate said pairs of discs in the same or opposite directions.

19. A device according to claim 18, each of said pairs of discs having a rim extending radially outwardly from the periphery thereof, said rim being engaged by the drive roll for said pair of discs.

20. A device according to claim 19, said means for turning said drive wheels comprising a knob attached to a driving shaft having a driving gear and one of said driving rolls mounted therein, the other driving roll being mounted on a driven shaft parallel to said driving shaft and having mounted thereon a gear driven by said driving gear.

21. A device according to claim 11, said means for rotating said assemblage comprising a rotatable flexible driving roll mounted on said container and engaging the periphery of said discs.

22. A device according to claim 3, said plates being flat and being generally normal to said apex line when in closed position over said opening, said compartments each being partitioned into a plurality of pockets of different shape, at least one pocket in each compartment containing a plurality of said pieces, the floor of the piece receiving pocket in one of said compartments being located at a greater elevation than the floor of the piece receiving pocket in said other compartment.

23. A device according to claim 3, one of said compartments being partitioned into a plurality of pockets which are located at the upper portion of said compartment and each of which contains a plurality of said pieces, the other compartment having a pocket containing a plurality of said pieces and extending from the top of said plates a substantial distance below the bottom of said plurality of pockets.

24. A device according to claim 1, said viewing window being large enough to view said pieces therethrough with both eyes.

25. A device according to claim 8, said plates being generally vertical and generally normal to the apex line of said mirrors when in closed position, said closure being pivotally attached to said container at the lower end thereof for said swinging movement of said closure and having a handle located above said pivot for swinging said closure, said closure being spring biased to close position.

26. A device according to claim 1, said apex line of said mirrors being inclined to the horizontal downwardly from said one end to said other end thereof; and the plane of said viewing window being also inclined to the horizontal at a substantially greater angle than said apex.

References Cited

UNITED STATES PATENTS

| | | | |
|---|---|---|---|
| 2,454,577 | 11/1948 | Smith | 350—4 |
| 3,011,392 | 12/1961 | Prochazka | 350—5 |
| 3,318,187 | 5/1967 | Prohaska | 350—4 |

MORTON ANSHER, Primary Examiner

DAVID S. STALLARD, Assistant Examiner

U.S. Cl. X.R.

353—1